(12) United States Patent
Albright et al.

(10) Patent No.: US 8,813,882 B2
(45) Date of Patent: Aug. 26, 2014

(54) FORAGE CONVEYOR DRIVE SYSTEM

(71) Applicant: Meyer Manufacturing Corporation, Dorchester, WI (US)

(72) Inventors: Chris Albright, Abbotsford, WI (US); Dan Decker, Dorchester, WI (US)

(73) Assignee: Meyer Manufacturing Corporation, Dorchester, WI (US)

( * ) Notice: Subject to any disclaimer, the term of this patent is extended or adjusted under 35 U.S.C. 154(b) by 157 days.

(21) Appl. No.: 13/653,962

(22) Filed: Oct. 17, 2012

(65) Prior Publication Data

US 2014/0105710 A1   Apr. 17, 2014

(51) Int. Cl.
  *A01D 90/10* (2006.01)
  *B60P 1/38* (2006.01)
(52) U.S. Cl.
  CPC .. *A01D 90/10* (2013.01); *B60P 1/38* (2013.01)
  USPC ............. 180/53.6; 239/670; 56/10.8; 56/11.4
(58) Field of Classification Search
  USPC .......... 180/53.1, 53.6, 53.61, 53.62; 414/327, 414/528; 239/670, 684, 686; 56/10.8, 11.2, 56/11.4, 11.5
  See application file for complete search history.

(56) References Cited

U.S. PATENT DOCUMENTS

| | | | | |
|---|---|---|---|---|
| 3,214,049 A | * | 10/1965 | Grove | 414/502 |
| 3,595,289 A | * | 7/1971 | Greiner | 241/83 |
| 3,641,764 A | * | 2/1972 | Destefan et al. | 60/484 |
| 4,171,180 A | * | 10/1979 | Wagstaff et al. | 414/502 |
| 7,543,765 B1 | * | 6/2009 | Elling | 239/663 |
| 2013/0140098 A1 | * | 6/2013 | Stauvermann et al. | 180/14.1 |

* cited by examiner

*Primary Examiner* — Drew Brown
(74) *Attorney, Agent, or Firm* — Boyle Fredrickson, S.C.

(57) ABSTRACT

A forage transporter allowing both front and rear unloading using an apron conveyor passing along the floor of the forage transporter provides a single control lever selectively enabling a forward drive for forward unloading and a rear drive for rear unloading while providing a mechanical lockout preventing simultaneous activation of the front and rear drives.

17 Claims, 5 Drawing Sheets

FORAGE CONVEYOR DRIVE SYSTEM

STATEMENT REGARDING FEDERALLY
SPONSORED RESEARCH OR DEVELOPMENT

Not applicable.

CROSS REFERENCE TO RELATED
APPLICATION

Not applicable.

BACKGROUND OF THE INVENTION

The present invention relates to forage boxes and in particular to an improved mechanism for controlling a chain drive used to remove materials from the forage box.

Forage is generally plant material such as plant leaves and stems that may be eaten by grazing livestock but, as used herein, may also include other fodder material including grains and the like.

Forage is often transported to cattle or other animals through the use of a forage box supported on a trailer or truck for ready transport. The forage box may receive forage, for example, directly from a tractor-mounted shredder during a harvesting process, traveling next to the tractor during that harvesting. The forage boxes may then be transported to a location removed from the harvesting site where the forage will be stored or dispensed to the animals.

Typically forage boxes provide for a mechanism for ejecting forage from the forage box after the forage box has been filled. This mechanism is often in the form of an apron conveyor consisting of chains that pass along the floor of the forage box in a loop between separated and horizontally disposed front and rear driveshaft at the front and rear of the forage box floor. Rotation of the shafts causes the chains and crossbars on the chains to pull the forage along the floor and ejected the forage out of the box.

Versatile forage boxes may remove the forage from the rear of the box, typically to dispense the forage on the ground or in a ground-level container, or from the front of the box. Operating the forage box to remove forage from the front of the forage box offers finer control in the dispensing of the forage typically through a set of augers or similar feeder rollers which may meter the release of forage, for example, to be deposited on a cross conveyor, for example, for bagging or other operations.

During the front and rear unloading operations, the conveyor chains operate in opposite directions as driven by separate front and rear drive mechanisms associated with the front and rear driveshafts. These different drive mechanisms allow the upper length of the chain to always be operated in a pull, rather than push, fashion avoiding the need for complex and precise chain tensioning mechanisms.

It is critical that both of the front and rear drive mechanisms not be engaged at the same time such as could cause catastrophic failure of the equipment. Exclusive operation of only one of the front and rear drive mechanisms at a time is ensured through the use of a drive plate forming an essential mechanical coupling between each drive mechanism and its respective driveshaft. A single drive plate is provided that must be physically removed from the rear driveshaft to be placed on the front driveshaft in order to drive the front driveshaft, and physically removed from the front driveshaft to be placed on the rear driveshaft in order to drive the rear driveshaft. In this way, both driveshafts cannot be activated at the same time.

SUMMARY OF THE INVENTION

The present invention provides a forage box that greatly simplifies conversion between front unloading and rear unloading through the use of the drive mechanism having a control operator that may be accessed from a single location to exclusively connect either of the drive mechanisms to their respective driveshafts. The control operator implements a mechanical lockout providing assurance that only one driveshaft at a time may be connected. The need to move a drive plate, generally entailing an unbolting and bolting operation, may be replaced by a relatively simple movement of the control operator between two positions.

More specifically, the present invention provides a forage transporter having a forage container with a floor and upstanding sidewalls for defining a volume for holding forage. An apron conveyor provides one or more conveyor belts connected in a loop between a front and rear conveyor driveshaft positioned at a front and rear of the floor so that rotation of the front and rear conveyor driveshafts moves the conveyor belts along the floor to eject forage contained in the volume. A front and rear drive mechanism is attach to the front and rear conveyor driveshafts, respectively, the front drive mechanism operating to move the conveyor belts to eject forage from a front of the forage container and the rear drive mechanism operating to move the conveyor belt to eject forage from a rear of the forage container. A control operator accessible from a single location is manually movable to a first state to activate the rear drive mechanism while deactivating the front drive mechanism and movable to a second state to activate the front drive mechanism while deactivating the rear drive mechanism, the control operator providing a mechanical lockout preventing simultaneous activation of the rear drive mechanism and front drive mechanism.

It is thus a feature of at least one embodiment of the invention to eliminate the time-consuming and cumbersome need to move a single drive plate between a front and rear drive mechanism to convert a forage box from front unloading to rear unloading, while avoiding the possibility of simultaneous front and rearward activation of the apron conveyor.

The first state may be a positioning of the control operator in a first position and the second state may be the positioning of the control operator in a second state different from the first state.

It is thus a feature of at least one embodiment of the invention to provide a natural lockout of simultaneous operations by requiring mutually exclusive position states of a single operator.

The control operator may further be manually movable to a third position activating neither the front drive nor the rear drive mechanism and the third position may be located between the first and second positions.

It is thus a feature of at least one embodiment of the invention to mechanically enforce a deactivation of one driveshaft before activation of the other driveshaft to avoid the possibility of instantaneous simultaneous activation and the resulting mechanical shock.

The control operator may provide first and second independent axes of motion, and movement of the control operator along a first axis of motion may activate the rear drive mechanism and movement of the control operator along the second axis may activate the front drive mechanism, and a control operator guide may allow only movement along one axis at a time and a change in axial motion only when the control operator is at the third position.

It is thus a feature of at least one embodiment of the invention to mechanically restrain inadvertent rapid switching between front and rear unloading by requiring two-axes of motion preventing over-travel in one direction from changing the unloading mode.

The front drive mechanism may provide a power takeoff coupling for receiving rotating power communicating through a first clutch with the front conveyor driveshaft. The rear drive mechanism may provide a hydraulic motor receiving hydraulic power through a hydraulic valve and attached to the rear conveyor driveshaft. The control operator may then communicate with the first clutch and with the hydraulic valve to provide a positive mechanical interlock controlling the valve and the first clutch allowing operation of only one of the front and rear drive mechanisms at a time.

It is thus a feature of at least one embodiment of the invention to provide a mechanism that accommodates simultaneous control of different power sources better suited for front and rear unloading.

The first axis of motion may provide for a translation of a control shaft and a second axis of motion may provide a rotation of the control shaft, the control shaft communicating with the front and rear drive mechanisms.

It is thus a feature of at least one embodiment of the invention to provide a method of communicating mechanical control signals for two different control actions through a single mechanical shaft.

The control lever may be positioned at the front of the floor.

It is thus a feature of at least one embodiment of the invention to permit control of the unloading process at a point allowing closer supervision of front unloading commensurate with types of operations performed at these different unloading directions.

The forage transporter may further include wheels and axles supporting the forage container for transport along the ground.

It is thus a feature of at least one embodiment of the invention to provide a forage transporter that may be used as a trailer or as a truck component.

The first clutch may be a variable sheave belt drive and the motion between the first and third positions may change an effective gear ratio in transmission of mechanical power through the first clutch.

It is thus a feature of at least one embodiment of the invention to permit a single control to provide not only a shifting of modes from front unloading to rear unloading but to also control a speed of unloading.

The first axis of motion may be substantially horizontal and the second axis of motion may be substantially vertical.

It is thus a feature of at least one embodiment of the invention to enlist the mechanical advantage inherent in moving an operator with downward motion to control the variable "gearing" of the clutch.

The forage container may include a set of vertically arrayed, horizontally extending feeder rollers positioned at a front of the forage container and mechanically communicating with the power takeoff coupling to rotate the feeder rollers to eject forage from the forage container and further including a second clutch mechanism positioned between the power takeoff coupling and the vertically arrayed feeder rollers.

It is thus a feature of at least one embodiment of the invention to provide a system compatible with feeder rollers often used in forage boxes that may deactivate the rollers during rearward unloading.

The power takeoff coupling may communicate through the second clutch to a roller driveshaft for the vertically arrayed feeder rollers and communicate from the roller driveshaft to the front conveyor driveshaft through the first clutch.

It is thus a feature of at least one embodiment of the invention to ensure a correct sequencing of the feeder rollers and apron conveyor so that the feeder rollers are activated before front unloading of the forage box.

The first clutch may be a variable sheave belt drive.

It is thus a feature of at least one embodiment of the invention to provide a control operator that may control a direction of unloading as well as a rate of unloading.

The second clutch may communicate with the roller driveshaft through an elastic belt drive.

It is thus a feature of at least one embodiment of the invention to provide shock reduction inherent in V-belt drives and the like.

The forage container may include a cross conveyor extending perpendicular to axis of movement of the conveyor belts at the front of the floor, the cross conveyor mechanically communicating with the second clutch before the first clutch.

It is thus a feature of at least one embodiment of the invention to accommodate cross conveyors and to ensure their operation before operation of the apron conveyor such as might otherwise cause undesirable spillage of the forage.

These particular objects and advantages may apply to only some embodiments falling within the claims and thus do not define the scope of the invention.

DETAILED DESCRIPTION OF THE PREFERRED EMBODIMENT

Figure 1:
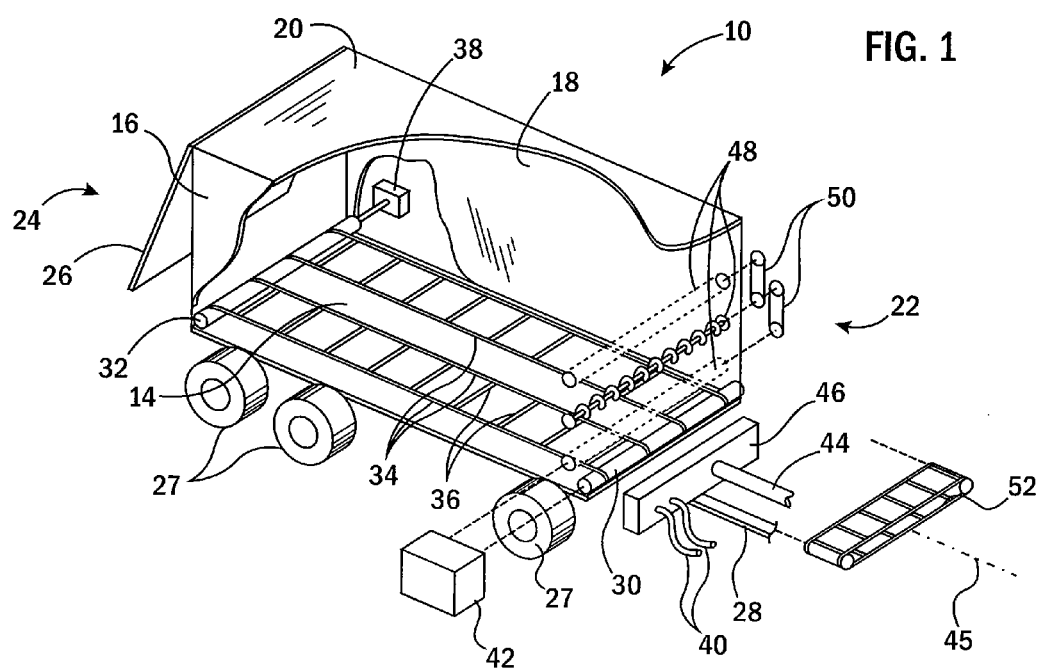
FIG. 1 is a perspective view in partial cutaway of an example forage wagon suitable for use with the present invention showing the forage box with an internal apron conveyor extending between front and rear conveyor driveshafts, the former attached to a front drive mechanism receiving power from a power takeoff (PTO) coupling and the latter attached to a rear drive mechanism having a hydraulic motor.

Referring now to FIG. 1, a front and rear unloading forage transporter 10 may include a forage box 12 providing a generally horizontal floor 14 and left and right upstanding sidewalls 16 and 18 defining a volume therein for receiving forage. The forage transporter 10 may optionally include a top 20 attached to the left and right upstanding sidewall 16 and 18 to partially cover the forage-receiving volume.

The forage box 12 may be open at a front face 22 and a rear face 24. The rear face 24 may be closed by pivoting door 26 hinging about a horizontal axis at the upper edge of the door (as shown) or two doors pivoting about vertical axes as hingeably attached to the left and right upstanding sidewalls 16 and 18 respectively (not shown).

Generally the forage box 12 will be attached to a wheel set 27, for example, to produce a forage wagon (as shown) which may be drawn by a draw bar 28 or as part of an integrated rear bed of a truck or the like (not shown).

Positioned at a front and rear edge of the floor 14 and generally parallel to the front and rear edges of the floor 14 are front and rear conveyor driveshafts 30 and 32 which may rotate along generally horizontal axes parallel to the floor 14 and aligned with their width. Apron chains 34 connected in a loop between and around the front and rear conveyor driveshafts 30 and 32 present a first extent above the floor 14 and a second extent returning below the floor 14 (not visible in FIG. 1). In one embodiment, the apron chains 34 are provided in pairs, each pair connected by slats 36 extending perpendicularly to the extent of the apron chains 34 which provide upwardly extending projections that may engage with the forage in the forage box 12. Rotation of the front and rear conveyor driveshafts 30 and 32 in one direction will cause the apron chains 34 to move so as to transport forage in one direction, for example, out of the rear of the forage box 12, and rotation of the front and rear conveyor driveshafts 30 and 32 in the opposite direction will cause the apron chains 34 to move so as to transport forage in the opposite direction, for example, out of the front of the box 12.

The rear conveyor driveshaft 32 may connect to a rear drive mechanism 38 being, in one embodiment, a hydraulic motor as will be described below. This hydraulic motor may receive pressurized hydraulic fluid from an external source through hydraulic lines 40, for example, connected to a hydraulic pump in a tractor or truck or the like.

The front conveyor driveshaft 30 connects to a front drive mechanism 42, as will be described in more detail below, which receives power from a power takeoff (PTO) driveshaft 44 extending forward from the front of the transporter 10 along a front-to-rear axis 45 to be received by a corresponding PTO output shaft of a tractor or truck (not shown). The PTO driveshaft 44 is received by an independent outfeed clutch 46 as will also be described below.

The front drive mechanism 42, as well as driving the front conveyor driveshaft 30, may drive a set of three feed rollers 48, for example augers, in rotation about a set of vertically displaced horizontal axes at the front face 22 of the feed box 12. Generally drive mechanism 38 may directly rotate the lowest most feed roller 48 through a direct coupling shaft and power may be transmitted to the other to feed rollers 48 through a set of overlapping chain drives 50.

The front drive mechanism 42 may further provide power to a cross conveyor 52 positioned beneath and in front of the feed rollers 48 to receive outflows from the feed rollers 48 and move them in a direction perpendicular to the front-to-rear axis 45.

Figure 2:
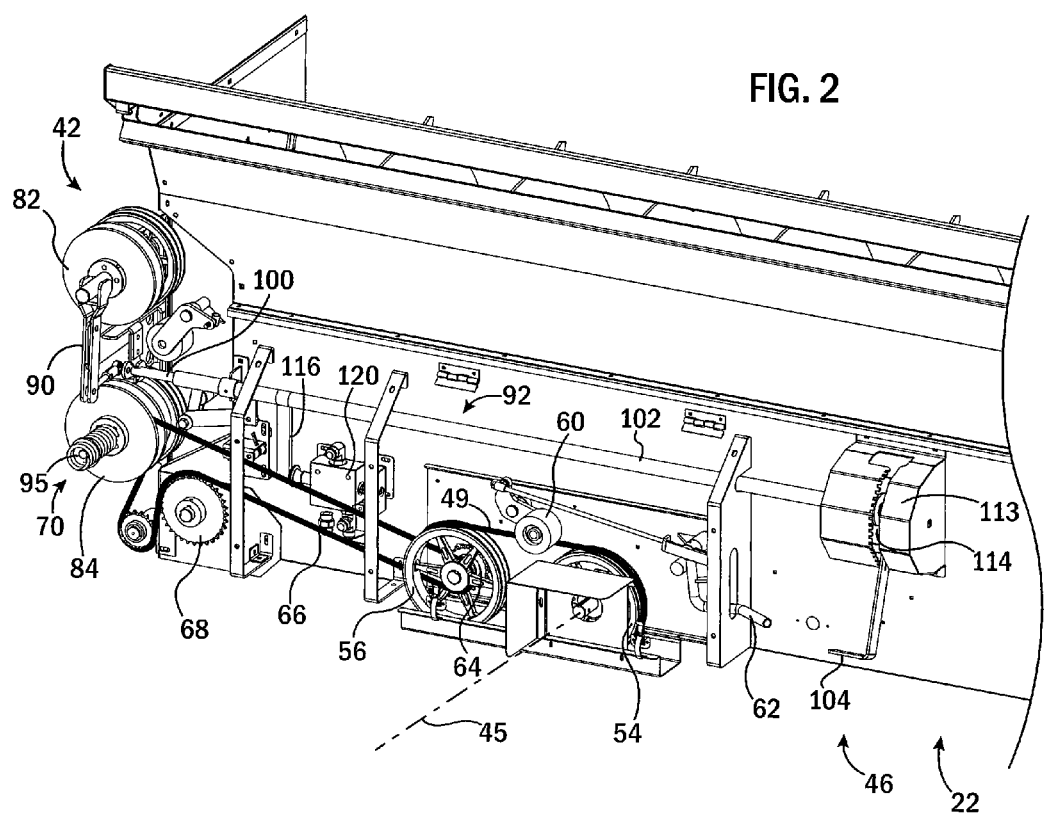
FIG. 2 is a perspective view of an outfeed clutch assembly communicating power between the PTO and the front drive mechanism showing a control operator used for control of the first clutch/variable speed drive applying power to the front conveyor driveshaft and for control of a hydraulic valve for applying power to the second conveyor driveshaft.

Referring now to FIG. 2, the outfeed clutch 46 may provide a pair of side-by-side pulley 54 and 56 rotating generally about axes parallel to the front-to-rear axis 45 and roughly aligned with the axis of the PTO driveshaft 44, the latter of which connects directly to pulley 54. The pulleys 54 and 56 are joined by a V-belt 49 of the reinforced elastomeric material that fits loosely about the pulleys 54 and 56 when the clutch 46 is released and which, when the clutch 46 is engaged, is tightened around the pulleys 54 and 56 by an idler wheel 60 moved against the V-belt 49 by a clutch actuation lever 62 that may be manually engaged by operator.

When the outfeed clutch 46 is engaged, a chain drive sprocket 64 attached coaxially with pulley 56 drives a chain 66 which engages a cross feed conveyor drive pulley 68 driving the cross conveyor 52 (shown in FIG. 1) and a auger drive sprocket 70 forming part of the front drive mechanism 42.

Figure 3:
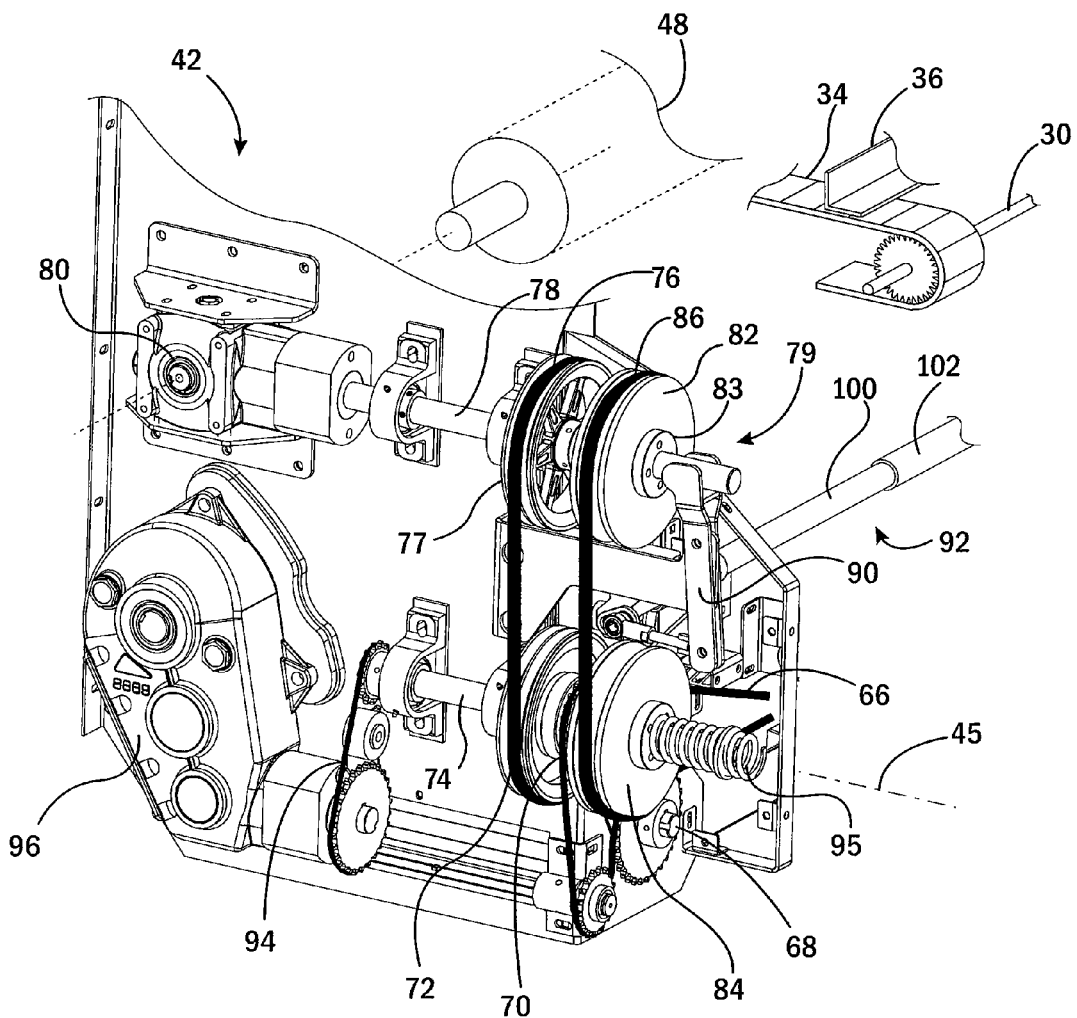
FIG. 3 is a perspective view of the clutch/variable speed drive applying power to the front conveyor driveshaft and the feeder rollers.
Figure 4:
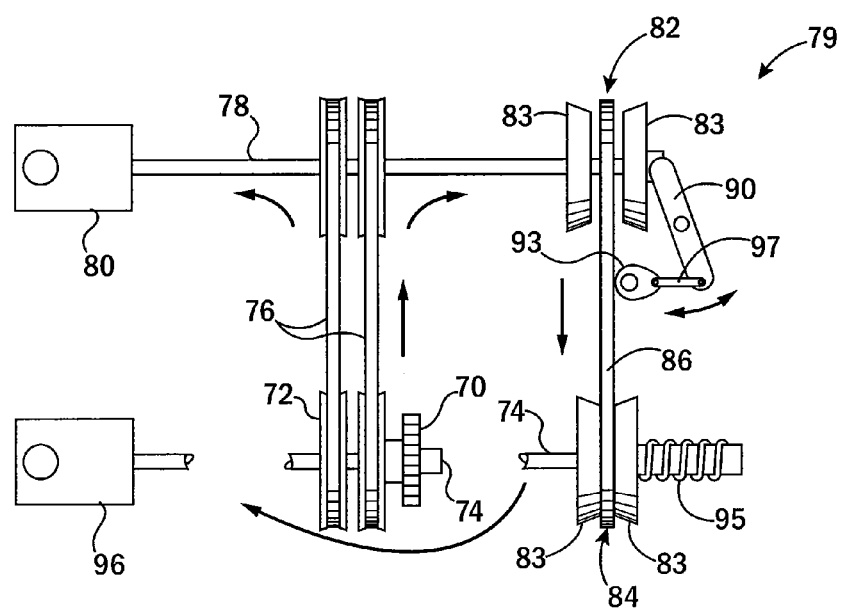
FIG. 4 is a simplified elevational view of the front drive mechanism showing the power transmission path through a chain sprocket, a set of belt drives and the clutch/variable speed drive.

Referring now to FIGS. 3 and 4, the auger drive sprocket 70 is attached to dual groove V-belt pulley 72 so that the two rotate together yet freely about a horizontal jack shaft 74 having an axis also parallel to the axis 45. The pulley 72 connects via a dual groove V-belt 77 with a corresponding coplanar dual groove V-belt pulley 76 displaced vertically from pulley 72 and attached to auger driveshaft 78 to rotate auger driveshaft 78. Auger driveshaft connects to right angle drive 80 which communicates with the lowermost feed roller 48 as also shown in FIG. 1.

Auger driveshaft 78 also connects with a clutch/variable speed drive C/VSD 79 formed by a master split sheave V-belt pulley 82 having co-rotating and separable opposed frustoconical sheaves 83. Pulley 82 is attached to auger driveshaft 78 to rotate therewith and a servant variable sheave belt pulley 84 as joined by single groove V-belt 86. As is generally understood in the art, by changing the separation between the sheaves of the master pulley 82, the effective diameter of the master pulley 82 may be changed controlling an effective "gear" ratio between pulleys 82 and 84. Separation of the sheaves of the pulley 82 beyond a certain point provides a clutch action effectively disengaging pulley 82 from 84.

The separation of the sheaves 83 of the master pulley 82 is controlled by a pivoting lever 90 driven by a control shaft 92. As best shown in FIG. 4, the control shaft 92 terminates at a crank 93 communicating with an arm 97 to one end of lever 90, the other end of which attaches to one of the sheaves 83 of pulley 82.

The sheaves of the servant pulley 84 are spring biased by helical compression spring 95 to accommodate the changing effective diameter of pulley 82 by reducing or expanding the effective diameter of servant pulley 84, passively, against the spring biasing of compression spring 95.

Servant pulley 84 is attached to jack shaft 74 to rotate therewith and to drive a chain drive 94 communicating with right angle gear drive 96, the latter which may communicate rotative power directly to front conveyor driveshaft 30.

It will be generally understood then that power is directly conducted from the PTO driveshaft 44 to the feed rollers 48 when the outfeed clutch 46 (shown in FIG. 2) is engaged. That power is only then applied to the front conveyor driveshaft 30 with engagement of C/VSD 79. This design allows the operator to control the rate of feed forage into the feed rollers 48 while ensuring that the feed rollers 48 will be up to speed before any forage is directed into them. The V-belts 77 and 86, as well as transferring power, provide for torsional shock absorption.

Figure 5:
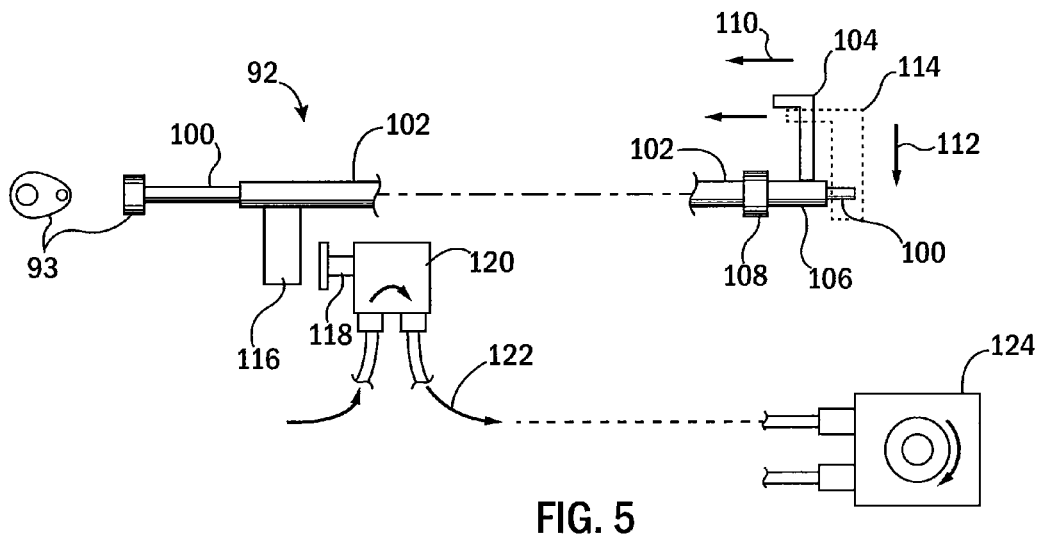
FIG. 5 is a simplified view of the control operator in a front-unload position activating the rear drive mechanism.

Referring now to FIGS. 2 and 5, the control shaft 92 may include a central shaft 100 surrounded by a coaxial tubular shaft 102, both extending generally perpendicular to axis 45 across a front of the transporter 10. The central shaft 100 attaches directly to the crank 93 and extends rightward (as depicted in FIG. 2) to a control operator 104 in the form of an L-shaped lever extending radially from the end of the control shaft 92. The lever may be attached to a splined collar 106 that may slide along central shaft 100 and rotate therewith as a result of entering gauging splines on the central shaft 100 and splined collar 106. The collar 106 may further be connected to the outer tubular shaft 102 through a swivel coupling 108. In this way, axial motion 110 of the control operator 104 is transmitted through the outer tubular shaft 102 without affecting the inner shaft 100, whereas rotational motion 112 of the control operator 104 is transmitted through the central shaft 100 to the crank 93 without affecting the outer tubular shaft 102.

A guide cowling 113 provides a slot 114 constraining motion of the control operator 104 to be able to move axially only when the control operator 104 is fully raised and to move rotationally only when the control operator 104 is in its full rightmost axial position.

As depicted in FIG. 5, when the control operator 104 is in its full leftmost and full raised position, the crank 93 will be positioned to fully disengage the sheaves 83 of pulley 82 (shown in FIG. 4) thus effectively disconnecting front conveyor driveshaft 30 (shown in FIG. 1) and allowing the front conveyor driveshaft 30 to freewheel. The outer tubular shaft 102 will be in its full leftmost position so that a tab 116 extending from the tubular shaft 102 will be removed from an operator 118 of a hydraulic valve 120. This allows the hydraulic valve 120 to open allowing hydraulic fluid 122 to pass into hydraulic motor 124 forming the rear drive mechanism 38 and attached to the rear conveyor driveshaft 32. Thus, the front conveyor driveshaft 30 will be disconnected and the rear conveyor driveshaft 32 fully connected to rotate under the influence of received hydraulic fluid. This in turn allows discharge of forage from a rear of the forage box 12 through rearward motion of the upper extent of the apron chains 34 (shown in FIG. 1).

Figure 6:
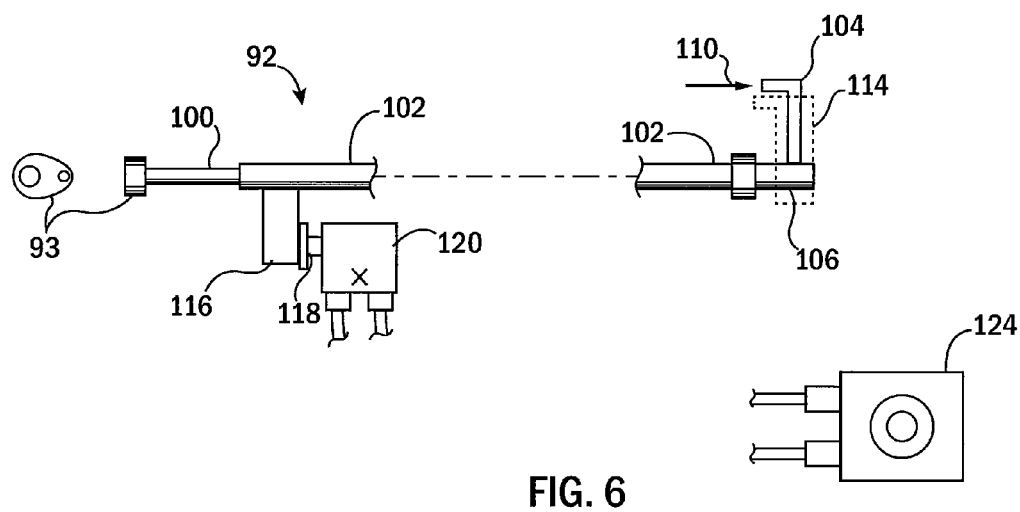
FIG. 6 is a figure similar to that of FIG. 5 showing the control operator in a intermediary position disengaging the front and rear drive mechanisms.

Referring now to FIG. 6, control operator 104 may be retracted or moved to rightward in the axial direction as guided by slot 114 to an intermediate position. This retraction does not rotate shaft 100 and thus leaves the front conveyor driveshaft 30 disengaged from power but does retract outer tubular shaft 102 so that tab 116 engages operator 118 stopping hydraulic fluid flow and thus motion of hydraulic motor 124. The hydraulic motor 124 may include an internal relief valve or a ratchet coupling allowing it to freewheel in a backward direction when hydraulic fluid flow ceases. Thus, in this intermediate position, neither the front conveyor driveshaft 30 nor the rear conveyor driveshaft 32 are engaged with driving power and may freewheel.

It will be appreciated that an alternative type of hydraulic valve 120 may be used and the tab 116 may be repositioned so that removal of engagement of the tab 116 and operator 118 will cause a closing of the valve 120 and that the selection of a particular type valve 120 is simply a matter of engineering choice.

Figure 7:
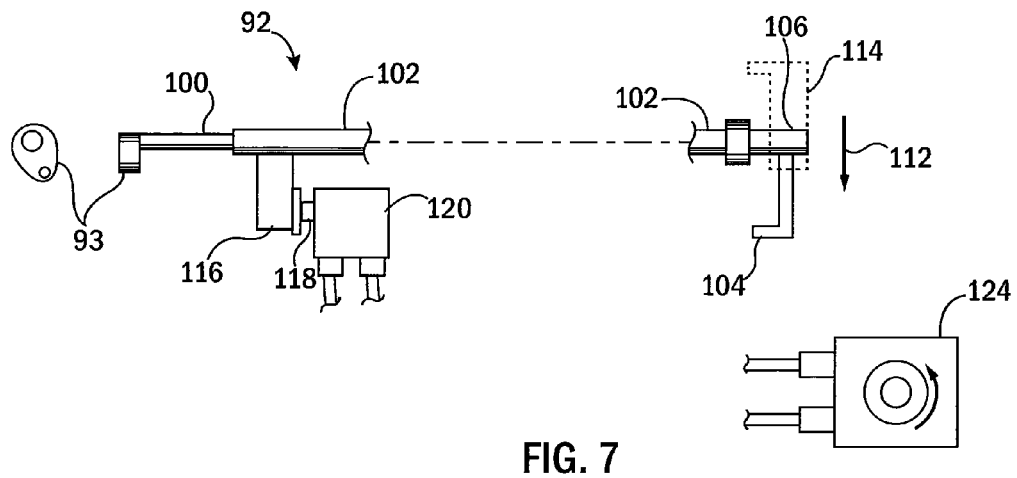
FIG. 7 is a figure similar to that of FIGS. 5 and 6 showing the control operator in a rear unload position operating the front drive and controllably adjusting the speed of the drive.

Referring to FIG. 7, the operator 104, once at the intermediate position, may be pulled downward in rotation by a variable amount to rotate the crank 93 to engage the C/VSD 79 (shown in FIG. 4) and thus to cause rotation of the front conveyor driveshaft 30 starting at low rates of rotation and increasing that rotational rate with further rotational movement of the operator 104 downward in rotational motion 112. This rotation downward of the operator 104, by virtue of the swivel coupling 108, does not cause tab 116 to move away from operator 118 of valve 120 and thus holds hydraulic motor 124 in its off state. It will be appreciated that the slot 114 requires this simultaneous disengagement of the front conveyor driveshaft 30 and rear conveyor driveshaft 32 before engagement of the front conveyor driveshaft 30 may be undertaken.

In the above discussion, it will be understood that although chains are described for use in the apron conveyor, that other similar materials may be used including reinforced belts and the like all of which will generally be termed belts. Further, while the above description shows a single control lever, it will be appreciated that alternative operator configurations may be used including, for example, two operator elements mechanically interlocked to act as one lever with respect to locking out simultaneous activation of the front and rear drive rollers. In addition, the term "gear ratio" should be understood as not requiring gears but refer equally to the variable diameter belt drives and the like.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A forage transporter comprising:
   a forage container having a floor and upstanding sidewalls for defining a volume for holding forage;
   an apron conveyor providing one or more conveyor belts connected in a loop between a front and rear conveyor driveshaft positioned at a front and rear of the floor so that rotation of the front and rear conveyor driveshafts moves the conveyor belts along the floor to eject forage contained in the volume;
   a front and rear drive mechanism attached to the front and rear conveyor driveshafts respectively, the front drive mechanism operating to move the conveyor belts to eject forage from a front of the forage container and the rear drive mechanism operating to move the conveyor belt to eject forage from a rear of the forage container; and
   a control operator accessible from a single location manually movable between a first state to activate the rear drive mechanism while deactivating the front drive mechanism and a second state to activate the front drive mechanism while deactivating rear drive mechanism, the control operator adapted to provide a mechanical lockout preventing simultaneous activation of the rear drive mechanism and front drive mechanism.

2. The forage transporter of claim 1 wherein the first state is a positioning of the control operator in a first position and the second state is the positioning of the control operator in a second position separated from the first position.

3. The forage transporter of claim 2 wherein the control operator is further manually movable to a third position activating neither the front drive nor the rear drive mechanism and wherein the third position is located between the first and second positions.

4. The forage transporter of claim 3 wherein the control operator provides first and second independent axes of motion and where movement of the control operator along a first axis of motion controls activation of the rear drive mechanism and movement of the control operator along the second axis controls activation of the front drive mechanism and further including a control operator guide allowing only movement along one axis at a time and a change in axial motion only when the control operator is at the third position.

5. The forage transporter of claim 1 wherein the first axis of motion provides a translation of a control shaft and a second axis of motion provides a rotation of the control shaft, the control shaft communicating with the front and rear drive mechanisms.

6. The forage transporter of claim 1 wherein the front drive mechanism provides a power takeoff coupling for receiving rotating power communicating through a first clutch with the front conveyor driveshaft and wherein the rear drive mechanism provides a hydraulic motor receiving hydraulic power through a hydraulic valve and attached to the rear conveyor driveshaft and wherein the control operator communicates with the first clutch and with the hydraulic valve to provide a positive mechanical interlock controlling the valve and first clutch allowing operation of only one of the front and rear drive mechanisms at a time.

7. The forage transporter of claim 6 wherein the control operator provides first and second independent axes of motion and where movement of the control operator along a first axis of motion controls the hydraulic valve and movement of the control operator along the second axis controls operation of the first clutch and further including a control operator guide allowing only movement along one axis at a time and a change in axial motion only when the control operators at a third position on a single path between the first and second positions.

8. The forage transporter of claim 6 wherein the first clutch is a variable sheave belt drive and wherein motion along the second axis changes an effective gear ratio in transmission of mechanical power through the first clutch.

9. The forage transporter of claim 8 wherein motion between the third and second positions is in a substantially vertical direction.

10. The forage transporter of claim 6 further including a set of vertically arrayed, horizontally extending feeder rollers positioned at a front of the forage transporter and mechanically communicating with the power takeoff coupling to rotate the feeder rollers to eject forage from the forage transporter and further including a second clutch mechanism positioned between the power takeoff coupling and the vertically arrayed feeder rollers.

11. The forage transporter of claim 10 wherein the power takeoff coupling communicates through the second clutch to a roller driveshaft for the vertically arrayed feeder rollers and communicates from the roller driveshaft to the front conveyor driveshaft through the first clutch.

12. The forage transporter of claim 11 wherein the first clutch is a variable sheave belt drive.

13. The forage transporter of claim 1 wherein the second clutch communicates with the front conveyor driveshaft through an elastic belt drive.

14. The forage transporter of claim 6 further including a cross conveyor extending perpendicular to the axis of movement of the conveyor belts at the front of the floor, the cross conveyor mechanically communicating with the second clutch before the first clutch.

15. The forage transporter of claim 1 wherein the control operator is positioned at the front of the floor.

16. The forage transporter of claim 1 further including wheels and axles supporting the forage transporter for transport along the ground.

17. A forage transporter comprising:
a forage transporter having a floor and upstanding sidewalls for defining a volume for holding forage;
an apron conveyor providing one or more conveyor belts connected in a loop between a front and rear conveyor driveshaft positioned at a front and rear of the floor so that rotation of the front and rear conveyor driveshafts moves the conveyor belts along the floor to eject forage contained in the volume;
a power takeoff coupling for receiving rotating power communicating through a first clutch with the front conveyor driveshaft and attached to the front conveyor driveshaft to eject forage from a front of the forage transporter;
a hydraulic motor receiving hydraulic power through a hydraulic valve and attached to the rear conveyor driveshaft to eject forage from a rear of the forage transporter; and
a control lever manually movable between a first position to drive the front conveyor driveshaft from the power takeoff coupling while releasing the rear conveyor driveshaft for free rotation and a second state to drive the rear conveyor driveshaft from the hydraulic motor while deactivating the rear drive mechanism, the control operator adapted to provide a mechanical lockout preventing simultaneous activation of the rear drive mechanism and front drive mechanism.

* * * * *